Patented Feb. 24, 1948

2,436,711

UNITED STATES PATENT OFFICE 2,436,711

PREPARATION OF VINYL CHLORIDE

James A. Bralley, Akron, Ohio, assignor to The B. F. Goodrich Company, New York, N. Y., a corporation of New York No Drawing. Application November 9, 1944, Serial No. 562,742

7 Claims. (Cl. 260—656)

This invention relates to the preparation of vinyl halides such as vinyl chloride, vinyl bromide, etc., by an addition reaction between acetylene and a hydrogen halide, and pertains more specifically to a new catalyst for use in such a reaction.

It has previously been known that vinyl halides may be prepared by reacting acetylene with a hydrogen halide in the presence of a variety of metal halides as catalysts. When the reaction is carried out in the vapor phase, as is preferred, high temperatures, in the neighborhood of 200° C., have generally been required with catalysts of this type, a fact which limits the life of the catalyst.

I have now discovered a new catalyst for this reaction which overcomes the objection to the earlier catalysts described above, and which possesses other and further advantages which will be described hereinafter. My new catalyst has as its essential component a bivalent mercury compound in which at least one of the valences of the mercury is satisfied by a beta-halovinyl group, the remaining valence being satisfied by halogen. The materials included within this class are beta-chlorovinyl mercuric chloride and bis-(beta-chlorovinyl) mercury, as well as the corresponding beta-bromovinyl mercuric bromide, bis-(beta-bromovinyl) mercury, beta-fluorovinyl mercuric fluoride, bis-(beta-fluorovinyl) mercury, etc. These compounds may be prepared by the methods of Freidlina and Nesmeyanov, Chemical Abstracts 34, 6567 (1941), and of Jenkins, Journal of the Chemical Society 119, 748 (1921), starting with the appropriate mercuric halide. The catalytic material is preferably supported upon a surface-active carrier for use in a vapor-phase reaction; materials such as activated charcoal, silica gel, diatomaceous earth, or other similar material are suitable. These new catalysts may be used either individually or mixed with each other, or mixed with any of the known catalysts for this reaction, such as mercuric chloride, bismuth trichloride, metallic mercury, or the like.

The catalysts may be deposited upon the carrier from solution in any suitable solvent, merely by pouring the solution over the carrier and evaporating the solvent. In the case of beta-chlorovinyl mercuric chloride, I have found that acetone is the most suitable solvent, although other materials may be employed. In the case of bis-(beta-halovinyl) mercury, the liquid vinyl halide itself has been found to be an excellent solvent, and is particularly preferred because it eliminates the necessity for removal of the solvent from the highly absorbent carrier before use in the reaction. Inasmuch as it is impossible to remove all of the solvents from a carrier such as activated charcoal or silica gel, this catalyst offers great advantages over those hitherto known, which generally were soluble only in water, alcohol, or the like, for I have found that the presence of even minute amounts of these materials causes side reactions leading to products other than the desired vinyl halide, and has an adverse effect on the life of the catalyst.

The following specific examples are intended to serve as illustrations of the nature of my invention, and not as limitations on the scope thereof.

*Example I*

A solution of 232 grams of beta-chlorovinyl mercuric chloride (purified by re-crystallization from benzene) in 500 cc. of acetone was poured on 1375 cc. of silica gel in a 5-liter flask. The flask was then heated to 100° C. on a water bath for three hours to remove most of the acetone, and the catalytic material was then transferred to a catalyst tube. A mixture of acetylene and hydrogen chloride was passed through the catalyst tube at low temperature for a few minutes in order to remove the air and any remaining acetone. The catalyst tube was then immersed in an oil bath maintained at 100° C. After a two-hour period during which the flow of acetylene was maintained at about 700 cc. per minute, and the flow of hydrogen chloride at about 710 cc. per minute, there were obtained about 189 grams of vinyl chloride, over 90% of the theoretical amount.

*Example II*

A solution of 155 grams of beta-chlorovinyl mercuric chloride and 71 grams of mercuric chloride in 450 cc. of acetone was poured rapidly onto 1370 cc. of silica gel in a 5-liter flask. The flask was evacuated in order to remove most of the acetone, and the catalytic material was then transferred to a catalyst tube heated to 100° C. and subjected to a flow of nitrogen until no more acetone could be removed. Over a two-hour period about 70.9 liters of acetylene and 86.3 liters of hydrogen chloride were passed through the tube while it was maintained at 100° C. About 183 grams of vinyl chloride were obtained, over 96% of the theoretical amount. This is to be compared with a yield of 65 to 70% of the theoretical using mercuric chloride alone at a temperature of 200° C.

Example III

A solution of 9 grams of bis-(beta-chlorovinyl) mercury in 800 cc. of liquid vinyl chloride was poured over 560 cc. of activated charcoal. Most of the vinyl chloride was then allowed to boil away at room temperature, and a further amount was removed at reduced pressure. The catalytic material was placed in a reaction chamber maintained at 55° C. and a mixture of acetylene and hydrogen chloride in the proportion of one volume of acetylene to 1.25 volumes of hydrogen chloride was passed through. The yield of vinyl chloride was about 90% of the theoretical.

Similar excellent results are obtained in the synthesis of vinyl bromide or other vinyl halide from acetylene and the appropriate hydrogen halide in the presence of other catalysts within the scope of this disclosure, such as beta-bromovinyl mercuric bromide, beta-fluorovinyl mercuric fluoride, etc. Mixtures of these new catalysts with each other or with such catalysts as have been previously known for this reaction, such as the mixture described in Example II above, are also effective.

The reaction may be carried out in solution if desired, for example in water or in a suitable organic solvent, although best results have been obtained in the vapor phase.

Although the precise proportions of acetylene and hydrogen chloride employed are not critical, a slight excess of one or the other reactants usually gives best results. An excess of hydrogen chloride is usually preferred because this material is more easily separated from the product than is an excess of acetylene. The amount of catalyst employed, either alone or in mixtures, is not critical, even minute quantities having an appreciable effect upon the reaction. Similarly, the precise temperature at which the reaction is carried out is not critical, although no particular advantage is to be gained in using temperatures above about 200° C.

In order to test the corrosive action of the various vinyl chloride catalysts on iron under the same conditions, an iron strip of known weight was placed in solutions of the catalyst in methyl alcohol. The loss in weight of the iron strip showed the relative corrosive action of mercuric chloride, beta-chlorovinyl mercuric chloride and bis-(beta-chlorovinyl) mercury to be approximately 13,500 to 110 to one. Inasmuch as catalyst tubes or reaction chambers constructed of iron or steel are the cheapest and most commonly used for this reaction when it is carried out in the vapor phase, it has heretofore been impossible to reactivate the catalyst after exhaustion without removing the carrier completely from the reaction chamber, pouring a solution of the catalytic material over it, and drying it as completely as possible before returning it to the reaction chamber. Such a procedure, of course, is expensive and laborious. Since my new catalysts are practically non-corrosive to iron, the exhausted catalyst may be reactivated without removing it from the catalyst tube.

Although I have herein disclosed specific embodiments of my invention, I do not intend to limit myself solely thereto, but to include all of the obvious variations and modifications falling within the spirit and scope of the appended claims.

I claim:

1. The process of preparing a vinyl halide which comprises reacting acetylene with a hydrogen halide in the vapor phase in the presence of a previously prepared catalyst comprising as an essential component a bivalent mercury compound in which at least one of the valences of the mercury is satisfied by a beta-halovinyl group, the remaining valence being satisfied by halogen, and a surface-active carrier therefor.

2. The process of preparing vinyl chloride which comprises reacting acetylene with hydrogen chloride in the vapor phase in the presence of a previously prepared catalyst comprising as an essential component a bivalent mercury compound in which at least one of the valences of the mercury is satisfied by a beta-chlorovinyl group, the remaining valence being satisfied by chlorine, and a surface-active carrier therefor.

3. The process of preparing vinyl chloride which comprises reacting acetylene with hydrogen chloride in the vapor phase in the presence of a previously prepared catalyst comprising as an essential component beta-chlorovinyl mercuric chloride, and a surface-active carrier therefor.

4. The process of preparing vinyl chloride which comprises reacting acetylene with hydrogen chloride in the vapor phase in the presence of a previously prepared catalyst comprising as an essential component bis-(beta-chlorovinyl) mercury, and a surface-active carrier therefor.

5. The process of preparing vinyl chloride which comprises reacting acetylene with hydrogen chloride in the vapor phase in the presence of a previously prepared catalyst comprising as an essential component bis-(beta-chlorovinyl) mercury and activated charcoal as a carrier therefor, said mercury compound being deposited upon said activated charcoal from solution in liquid vinyl chloride.

6. The process of preparing a vinyl halide which comprises reacting acetylene with a hydrogen halide in the vapor phase in the presence of a previously prepared catalyst comprising as an essential component a bivalent mercury compound in which at least one of the valences of the mercury is satisfied by a beta-halovinyl group, the remaining valence being satisfied by halogen, and activated charcoal as a carrier therefor.

7. The process of preparing vinyl chloride which comprises reacting acetylene with hydrogen chloride in the vapor phase in the presence of a catalyst comprising as an essential component a bivalent mercury compound in which at least one of the valences of the mercury is satisfied by a beta-chlorovinyl group, the remaining valence being satisfied by chlorine, and activated charcoal as a carrier therefor.

JAMES A. BRALLEY.

REFERENCES CITED

The following references are of record in the file of this patent:

UNITED STATES PATENTS

| Number | Name | Date |
|---|---|---|
| 2,225,635 | Japs | Dec. 24, 1940 |

OTHER REFERENCES

Freidlina et al., "Comptes Rendus (Doklady) de l'Academie des Sciences de l'U. R. S. S.," vol. 26, pages 60–64 (1940).

Varshavsky, ibid, vol. 29, page 315 (1940).